United States Patent [19]
Baiamonte et al.

[11] Patent Number: 5,953,856
[45] Date of Patent: Sep. 21, 1999

[54] AGRICULTURAL BURNER

[76] Inventors: Paul Baiamonte, 42215 W.C.R. 29, Pierce, Colo. 80650; Robert C. Bowers, 35774 W.C.R. 51, Galeton, Colo. 80622

[21] Appl. No.: 09/200,169

[22] Filed: Nov. 25, 1998

Related U.S. Application Data

[63] Continuation-in-part of application No. 08/919,905, Aug. 28, 1997, abandoned.

[51] Int. Cl.$^6$ .................................................. A01M 15/00
[52] U.S. Cl. ..................................... 47/1.44; 126/271.2 R; 239/164
[58] Field of Search ................................. 47/1.01 R, 1.3, 47/1.44; 126/271.2 R, 271.2 C, 271.2 A; 239/176, 587, 169; 37/903

[56] References Cited

U.S. PATENT DOCUMENTS 2,839,047  6/1958  Davisson et al. ................ 126/271.2 C
3,727,346  4/1973  Kramer ..................................... 47/1.44
4,722,324  2/1988  Amen ................................. 126/271.2 R Primary Examiner—Robert Pezzuto
Attorney, Agent, or Firm—Dean P. Edmundson

[57] ABSTRACT

An apparatus for mounting to the three-point hitch of a tractor. The apparatus includes a frame, a fuel source, an elongated boom having two sections which are pivotably connected together at their ends, a burner head, and a fan for directing air through the outer section of the boom to the burner head. The apparatus is useful for burning ditches, etc. The boom can be rotated relative to a vertical mounting shaft on the frame, and it can also be raised or lowered as desired. The pivotable boom is able to reach out to either side of the tractor, and it can be folded for transport or storage. The boom can be folded so as to reach up and over ditch banks, fences, etc.

15 Claims, 12 Drawing Sheets

AGRICULTURAL BURNER

CROSS-REFERENCE TO RELATED APPLICATION

This application is a continuation-in-part of our application Ser. No. 08/919,905, filed Aug. 28, 1997, now abandoned.

FIELD OF THE INVENTION

This invention relates to portable or mobile apparatus for burning ditches, roadways, etc. More particularly, this invention relates to apparatus which can be mounted to a tractor for a variety of agricultural burning activities.

BACKGROUND OF THE INVENTION

Agricultural ditches (e.g., irrigation ditches) roadway ditches, etc. often must be burned to remove undesired weeds, grass or other growth. Conventional devices which have been used for these purposes include hand-carried propane burners or larger burners which are mounted on trailers and towed behind a tractor. Normally an operator must be positioned on the trailer to control and direct an elongated boom having a burner nozzle on its outer end. Another person operates the tractor to tow the trailer along the area to be burned. Thus, two persons are required to operate the apparatus. The operation is also time-consuming. Another disadvantage of that particular type of apparatus is that the person on the trailer gets bounced around as the equipment moves over rough ground. Also, the trailer operator is exposed to the heat, smoke and close flame at an unsafe distance. A further disadvantage of trailer units is that they have tires which can go flat.

Another type of commercial burning apparatus requires propane fuel. Such apparatus does not include an ignition source. Rather, the operator must start a fire under the burner head to light it, thereby creating an inconvenience and possibly a dangerous situation.

Another type of commercial burning apparatus (sold by Harsh) involves the use of diesel fuel for the burner, but it also requires the use of gasoline to power a 110 volt AC generator. The operator must inconveniently start and stop the generator from outside the tractor cab. The diesel burner head designs are not very efficient. Another disadvantage is that the fuel to air mixture is fixed. Also, the ignition system is complex and does not work well.

U.S. Pat. No. 4,722,324 (Amen) describes weed burning apparatus which can be mounted on a conventional three-point hitch on a tractor. The burning apparatus utilizes a single elongated straight boom which can be twenty or more feet long. The boom is pivotally mounted intermediate its ends on an upright support post, and a hydraulic cylinder is used to pivot the boom up and down. It can also be turned from side to side. Because the boom is straight, and because it is a single length of tubing, it is not capable of bending or folding in the middle. Consequently, the flame at the outer end of the boom is always separated from the tractor by a distance equal to the length of the straight boom. Further, because the boom is straight, it cannot reach upwardly and then down over a ditch bank into a ditch to be burned.

A further disadvantage of previous weed burners is that the very long boom extends twenty feet or more behind the tractor during transport. This situation thus presents a safety hazard during transport of the apparatus. If the boom is turned to one side it creates a different type of safety hazard because it can become caught on utility poles or posts.

U.S. Pat. No. 2,839,047 (Davisson) describes weed burning apparatus in which a boom can be turned from side to side with a sprocket and chain mechanism which allows for unacceptable movement of the boom at its outer end. The patent does not describe a boom which can be folded in the middle.

U.S. Pat. No. 3,727,346 (Kramer) describes a flame cultivator for row crops. The apparatus does not include a boom which can be folded in the middle.

There has not heretofore been described a weed burning apparatus which includes all of the features and advantages provided by the present invention.

SUMMARY OF THE PRESENT INVENTION

In accordance with the present invention there is provided apparatus for mounting to the three-point hitch of a tractor for burning weeds, ditch areas, etc. In a preferred embodiment the apparatus comprises:

(a) frame means including attachment means for detachably mounting the frame means to the hitch;

(b) fuel source means carried by the frame means;

(c) an elongated boom member carried by the frame means; wherein the boom member includes first and second ends; wherein the first end is pivotably mounted to the frame means; wherein the boom member includes first and second boom sections which are pivotably connected together at their ends such that the boom can be folded in, the middle; and wherein the second section is tubular;

(d) burner means carried by the outer end of the second section of the boom; and (e) fan means carried by the second section for directing air flow through the second section and outwardly through the burner means.

The apparatus of the invention enables the tractor operator to control all aspects of the operation of the burner from the cab of the tractor. No additional operator is required to handle the burner. The burner can be ignited, and the position of the boom can be fully and efficiently controlled, by the tractor operator from the cab.

The apparatus is designed to be connected to the standard three-point hitch on a tractor. Also, it does not require use of any special stand or jacks to support the apparatus when it is disconnected from the tractor. The fuel tank can be provided in any desired size. In a preferred embodiment the apparatus uses diesel fuel which is very safe and is available on virtually all farms. In an alternative embodiment the apparatus can utilize propane as the fuel source.

The apparatus of the invention includes a unique folding boom which enables the apparatus to have a very long reach for positioning the flame where desired. The boom can be manipulated to reach upwardly and over ditch banks or fences, for example, where conventional straight booms are not able to reach. Also, the folding boom enables the apparatus to be easily and safely transported from one location to another (without presenting a safety hazard while traveling down the road), and the folding feature also enables the apparatus to be folded into a compact form for storage. The boom can also be rotated from side to side. No previous weed burner has these capabilities. The boom can be selectively raised or lowered to match ground clearance levels.

The present apparatus also includes a unique burner head which is very efficient and in which the fuel is easy to ignite. The air flow through the burner head is smoother than in previously used burners and results in less turbulence. The burner is much more efficient than previously used burner heads. The new burner head produces a hotter flame than previous heads and also uses less fuel.

The present apparatus also utilizes a simple and reliable remotely controlled ignition system which the operator can control from the tractor cab.

Other advantages and features of the apparatus of the invention will be apparent from the following detailed description and the accompany drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
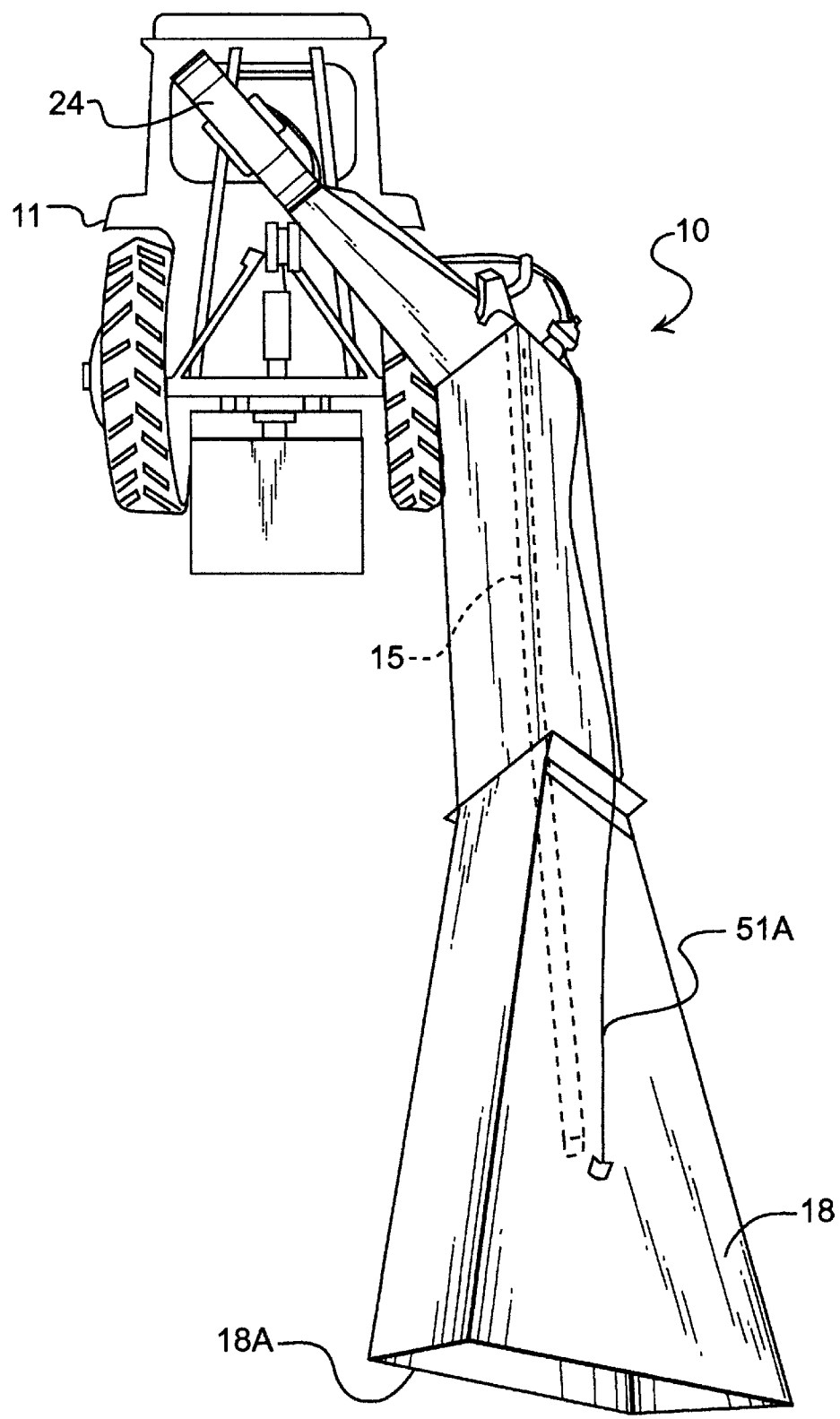
FIG. 1 is a rear perspective view of the apparatus of the invention attached to the three-point hitch of a tractor, wherein the boom is shown in its extended position.
Figure 2:
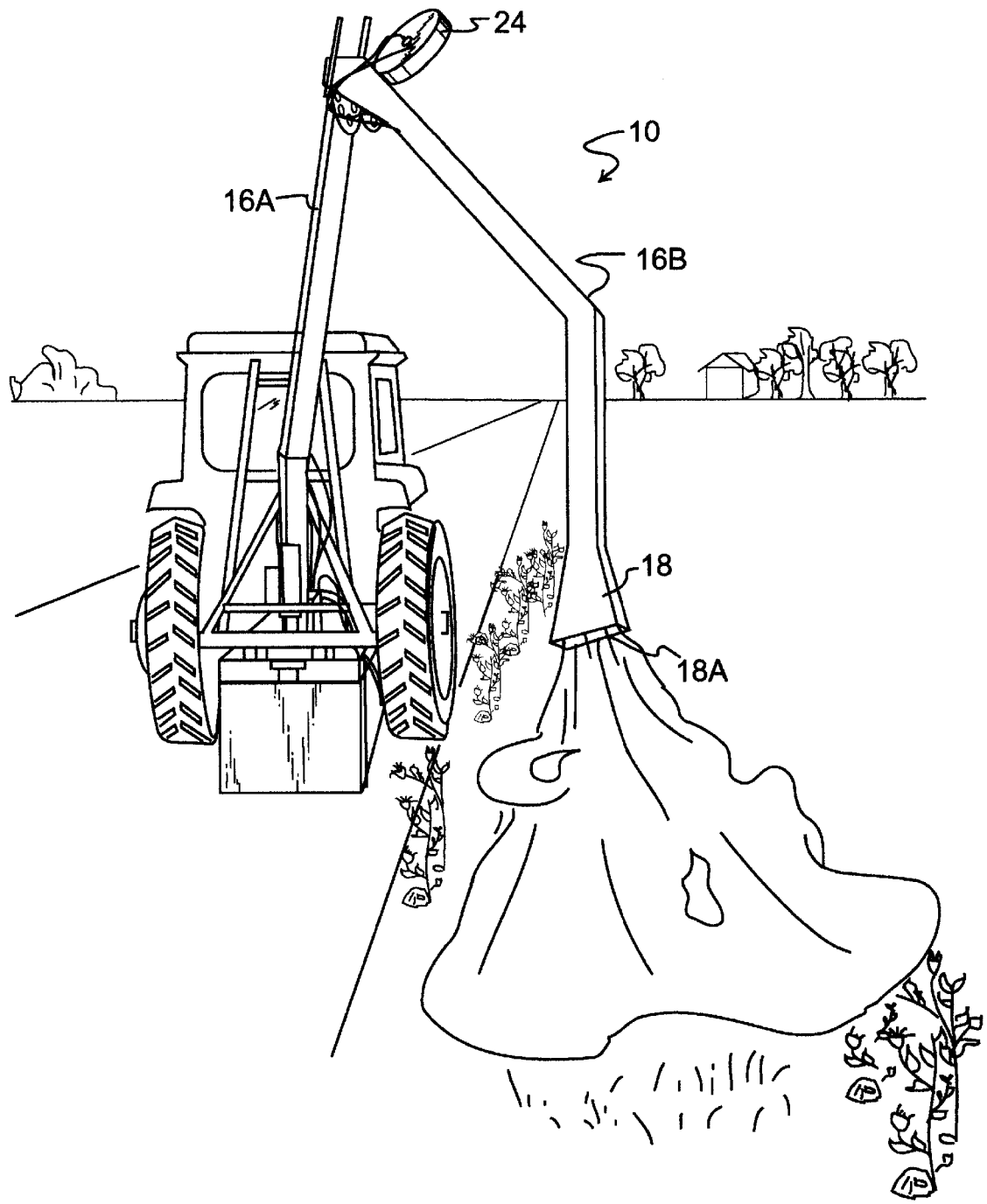
FIG. 2 is another rear perspective view of the apparatus shown in FIG. 1 showing one manner in which the apparatus may be used.

In the drawings there is shown and illustrated a preferred embodiment of apparatus 10 of the invention which is attached to the three-point hitch 11A of a conventional tractor 11. The apparatus comprises a frame 12, a fuel tank 14 carried by the frame, and upright support member 12A carried by the frame.

Figure 4:
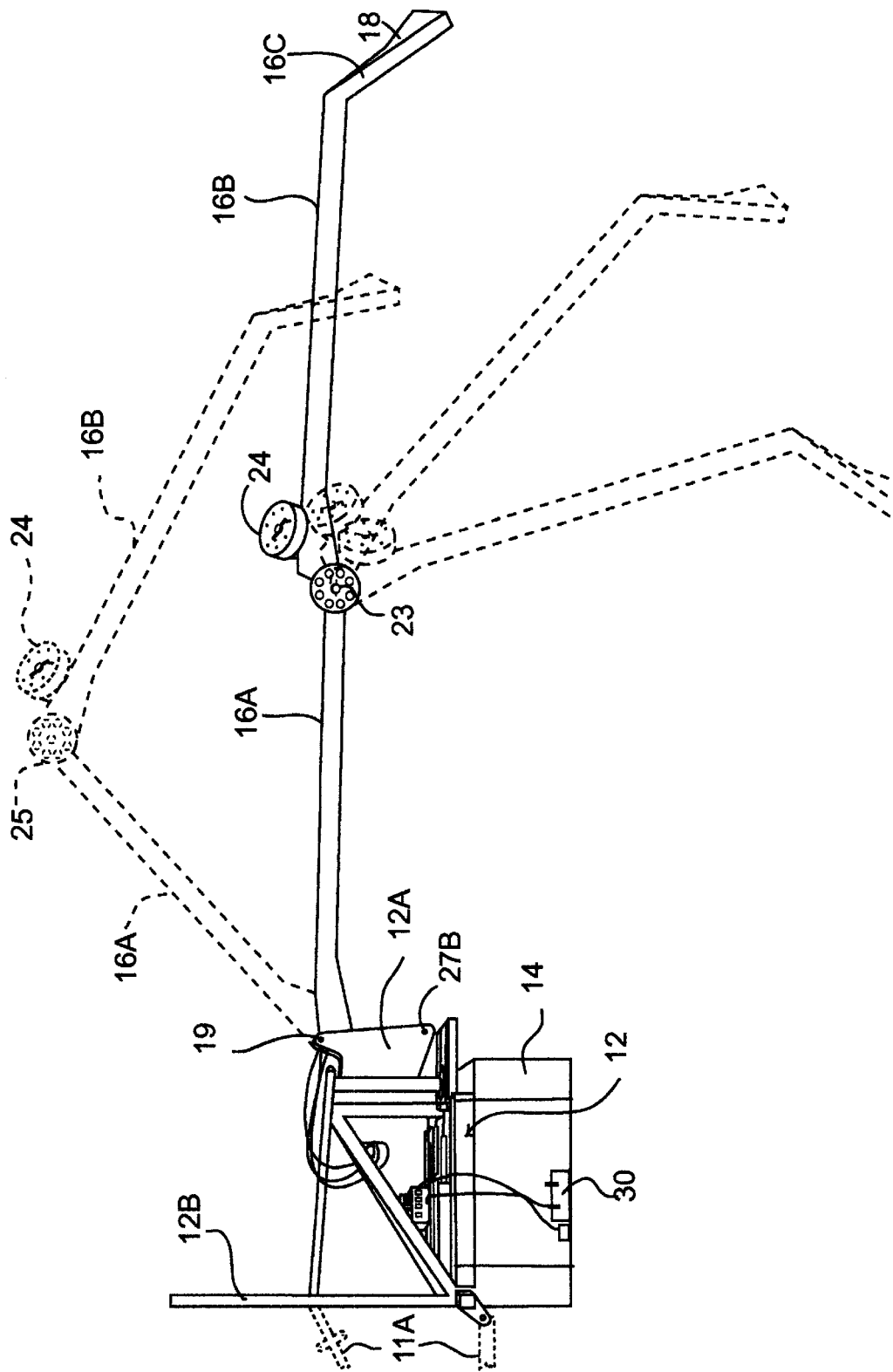
FIG. 4 is a side elevational view showing the manner in which the first and second boom sections are pivotally connected to each other.
Figure 5:
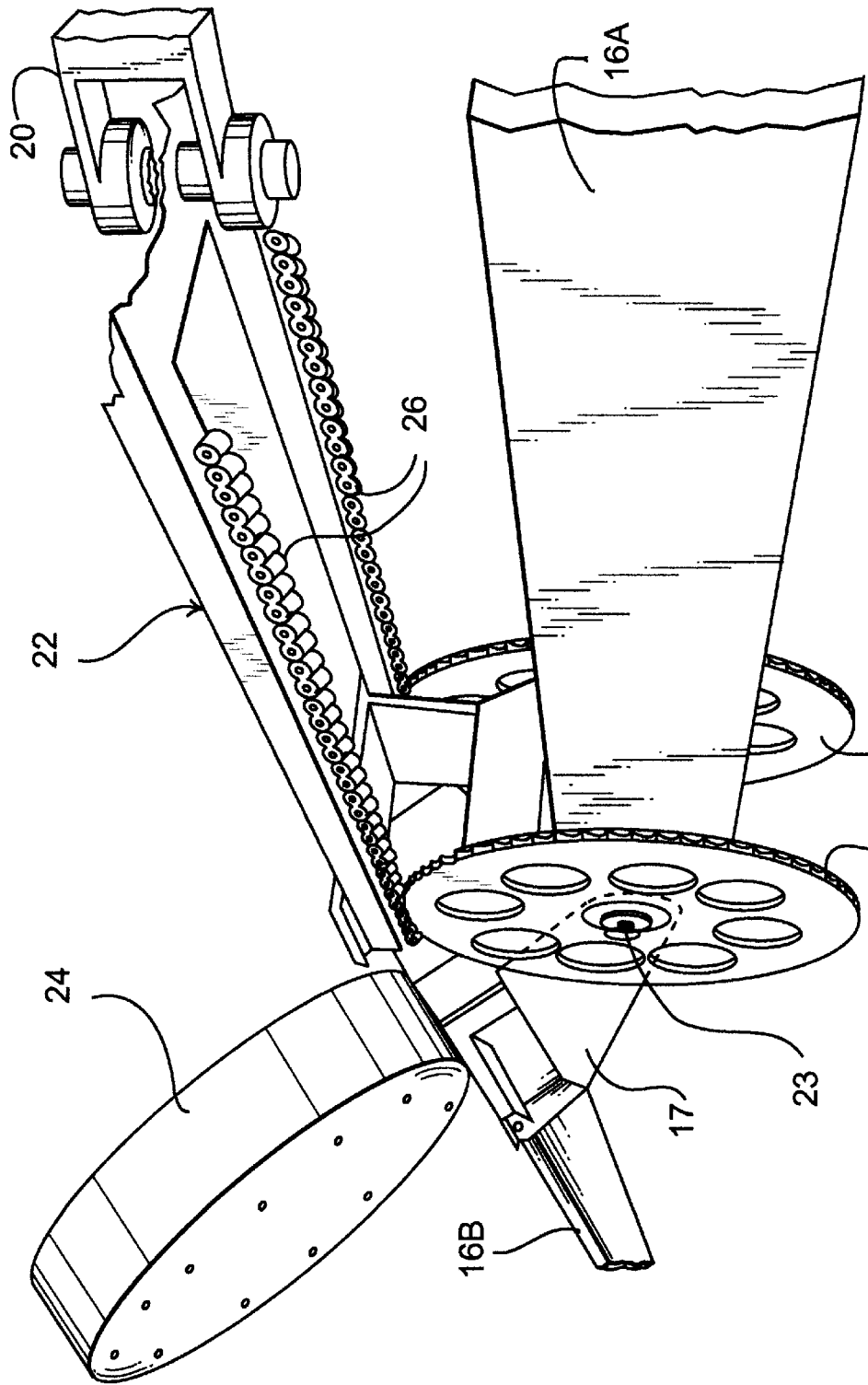
FIG. 5 is a perspective view showing the connection of the inner end of the second boom section to the outer end of the first boom section.

An elongated boom 16 is pivotably attached to and supported by the frame. The boom includes an inner or first section 16A and an outer or second section 16B. The two boom sections are connected together in end-to-end fashion at pivot point 23 such that these two sections are pivotable with respect to each other. A hydraulic cylinder 20 is connected between bracket 21 on boom section 16A and longitudinally movable carriage 22 at the outer end of boom section 16A. The hydraulic cylinder can be extended or retracted to selectively extend or retract the carriage 22 relative to gears 25 which are welded or secured to brackets or plates 17 which in turn are welded or secured to the inner end of outer boom section 16B. When the carriage 22 is pushed longitudinally outward (i.e. in the direction of the outer boom section), the racks 26 secured to carriage 22 engage the teeth or cogs on gears 25 and cause the gears to rotate on the pin or shaft 23. Because the gears 25 are welded or secured to the inner end of boom section 16B, rotation of gears 25 causes the outer boom section to pivot relative to the outer end of inner boom section 16A (on pin or pivot point 23), as illustrated for example in FIG. 4.

The outer boom section 16B is tubular, and fan or blower 24 is operably connected to boom section 16B such that air can be forced through section 16B and also through the burner head 18. The fan or blower is preferably hydraulically powered. Alternatively, the fan can be electrically powered.

If desired, the boom section 16B may include an angled outer portion 16C to facilitate directing the flame from burner 18 downwardly toward the ground. For example, an angle of about 45 degrees is preferred. Preferably the flattened output end 18A of the head is angled between horizontal and vertical so that it provides a desirable flame pattern for burning vegetation on the sides of irrigation ditches, for example.

Figure 7:
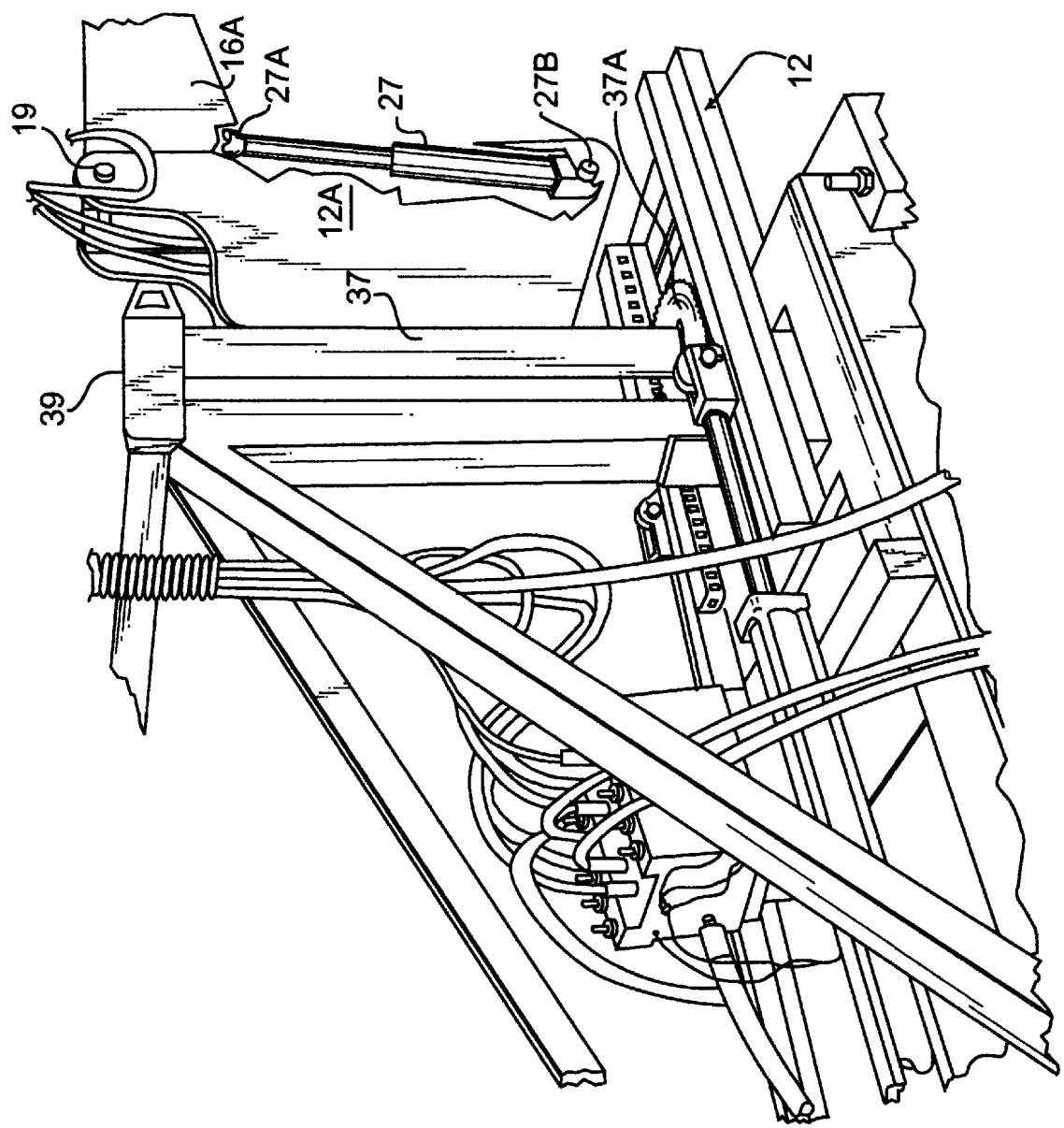
FIGS. 7 and 8 are perspective views showing the attachment of the inner end of the first boom section to the frame of the apparatus.

The inner end of boom section 16A is pivotably mounted with pin 19 to the upper end of support member 12A which is secured to vertical pin or shaft 37. The shaft 37 is pivotably supported or connected to the frame 12 by an upper bearing 39 and a similar bearing (not shown) at the lower end of shaft 37. Hydraulic cylinder 27 is connected at one end 27A to the inner end of boom section 16A and is connected at its opposite end with pin 27B to the lower end of support member 12A, e.g. as shown in FIG. 7. Cylinder 27 is movable between extended and retracted positions to selectively raise or lower boom section 16A about pivot pin 19.

Figure 8:
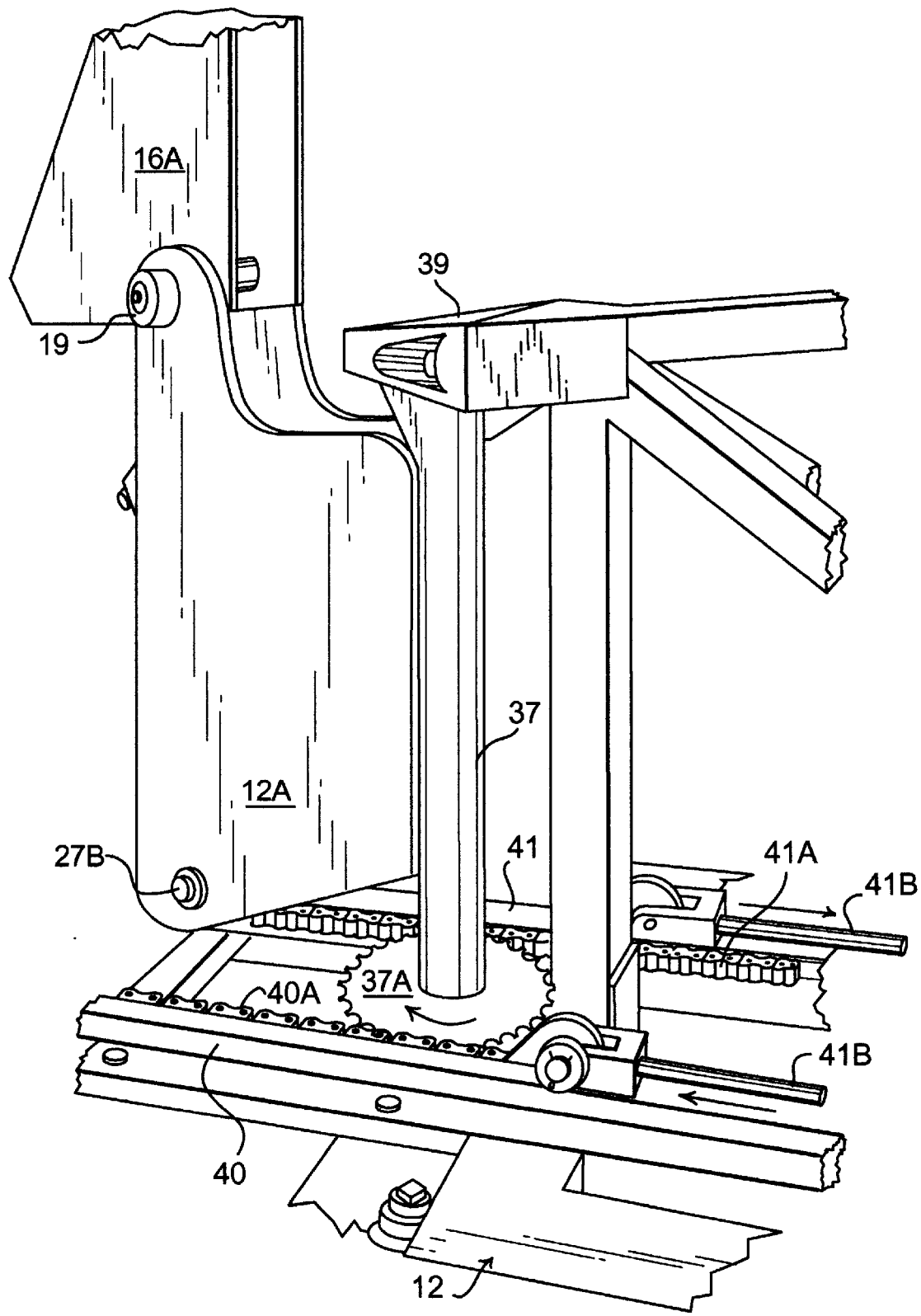
Figure 11:
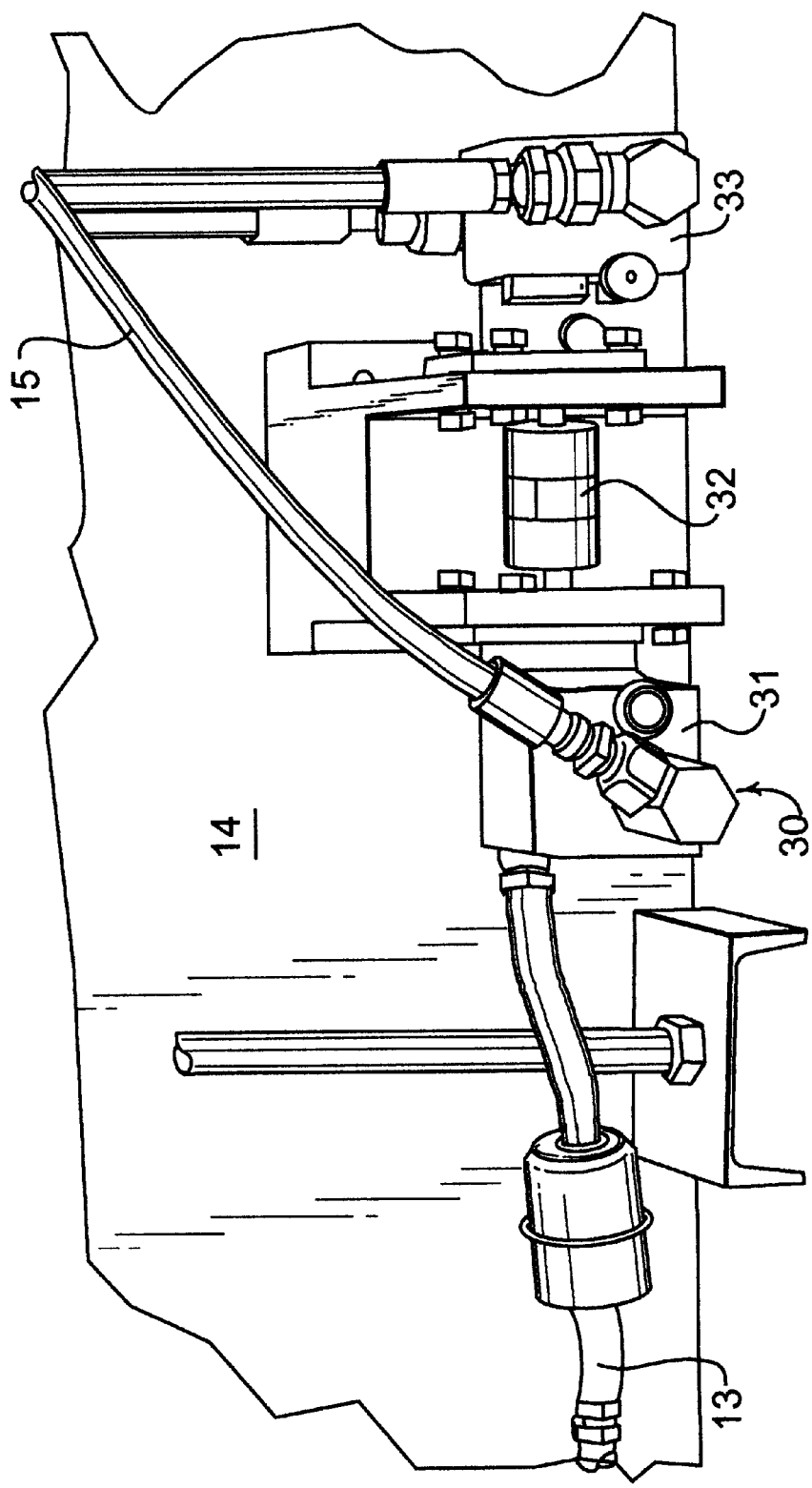
FIG. 11 is an elevational view showing preferred fuel pumping means for use in the apparatus.

Boom section 16A is also pivotable to the left or right about the axis of vertical pin 37. A gear 37A is secured to pin 37 as is illustrated in FIGS. 7 and 8. Parallel slide bars 40 and 41 are disposed on opposite sides of gear 37A and include racks 40A and 41A thereon, respectively. These racks engage gear 37A on opposite sides. The slide bars are attached at their inner end to hydraulic rams 40B and 41B, respectively. The two hydraulic rams are adapted to move simultaneously in opposite directions in order to rotate gear 37A either clockwise or counterclockwise, as desired, in order to cause the entire boom 16 to move to the left or to the right. Thus, when gear 37A is rotated in one direction, the boom is caused to move in the corresponding direction, and vice-versa. In this manner, the boom can be used to burn vegetation on either side of the path of travel of the tractor. Because the gear 37A is captured between the two racks 40A and 41A, the gear 37A (and thus the boom 16) is held very securely in any desired angular position. There is no play or give in the system which would otherwise allow the outer end of the boom to swing freely from side to side a few inches. Preferably, the rotation of shaft 37 is limited to a range of about 270 degrees so that the boom cannot bump against the tractor at any time. This can be effected, for example, by restricting the stroke of rams 40B and 41B.

Figure 9:
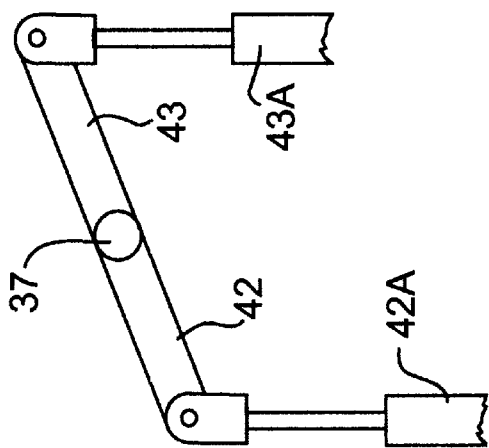
Figure 6:
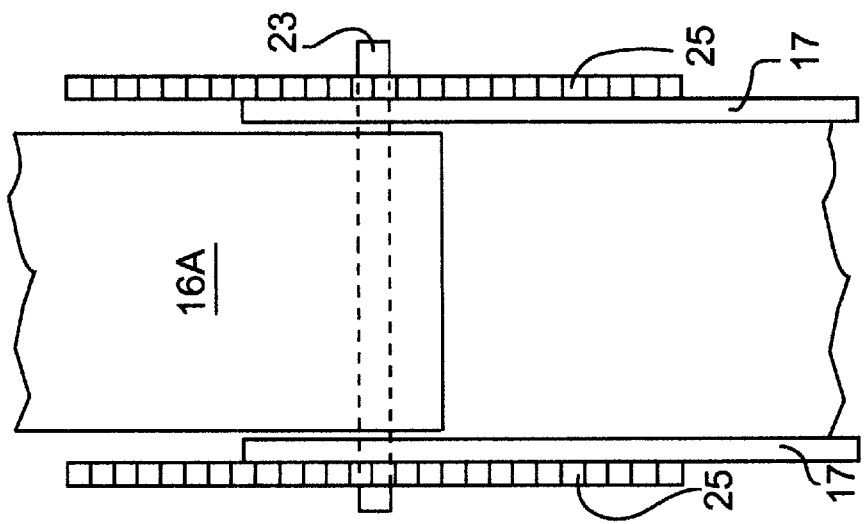
FIG. 6 is a bottom view showing the manner in which the inner end of the second boom section is pivotally attached to the outer end of the first boom section.

FIG. 9 illustrates another manner in which the shaft or pin 37 may be caused to rotate. In this embodiment, bars or ears 42 and 43 are secured to opposite sides of the shaft 37 and project outwardly. Rams 42A and 43A, respectively, are connected to the ears. When the rams are simultaneously moved in opposing directions, the shaft 37 is caused to rotate about its axis either clockwise or counter-clockwise. This action, of course, causes the boom 16 to move to the left or to the right, as desired.

Figure 10:
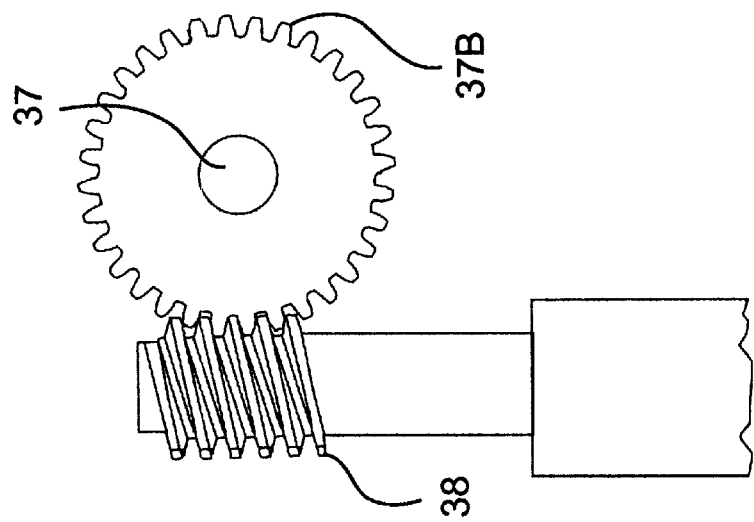
FIGS. 9 and 10 illustrate other mechanical means for turning the boom from side to side.

FIG. 10 illustrates another embodiment of a mechanism for rotating pin or shaft 37 about its axis. A gear 37B is secured to shaft 37 and a worm gear 38 engages gear 37B. When the worm gear 38 is rotated in one direction, the gear 37B and shaft 37 are caused to rotate in a given direction, and when the worm gear is rotated in the opposite direction, the gear 37B and shaft 37 are also caused to rotate in an opposite direction.

Figure 3:
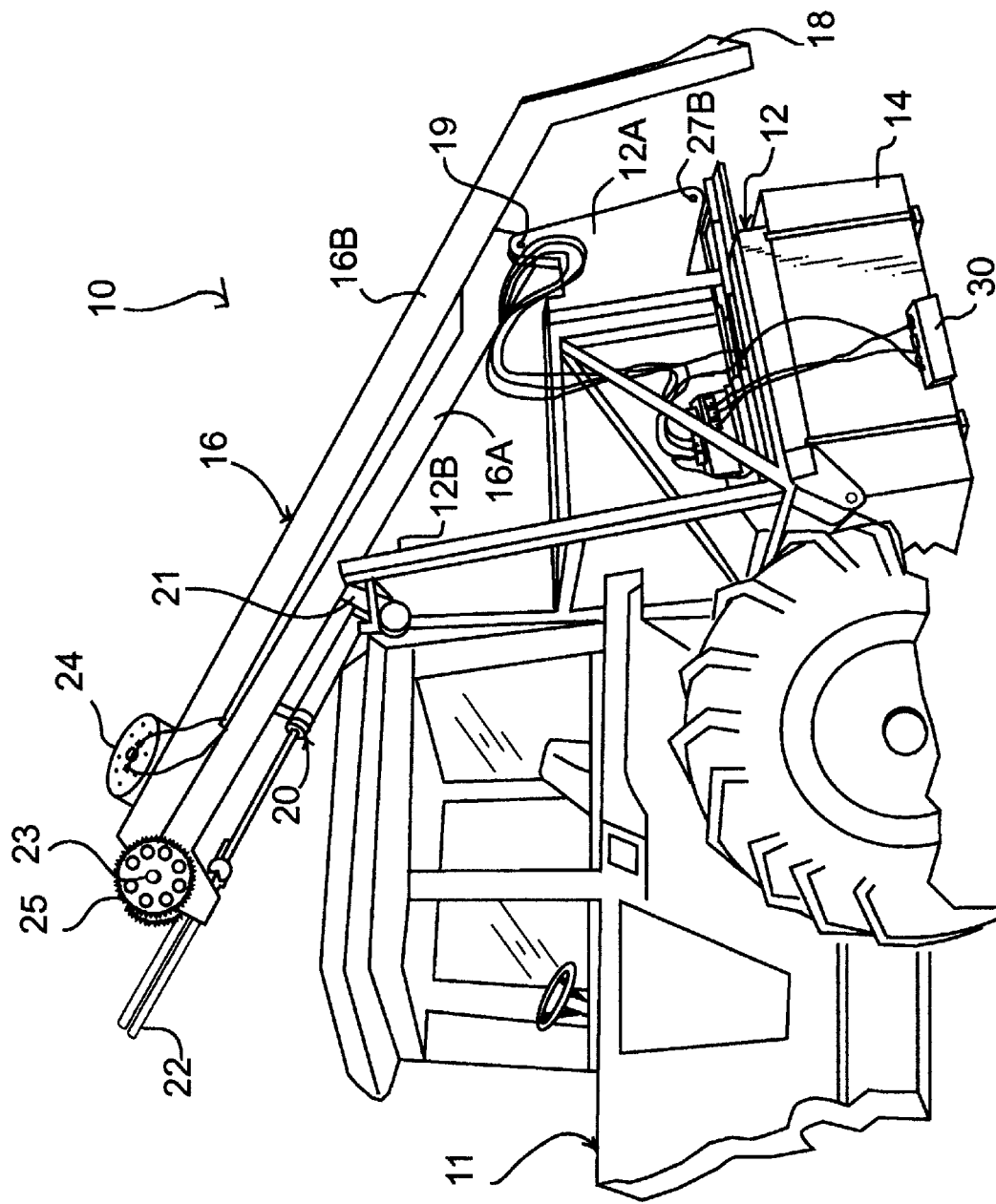
FIG. 3 is a side elevational view of the apparatus shown in FIG. 1, wherein the boom is in a retracted position for transport and compact storage.

FIG. 3 illustrates how compact the apparatus is when it is in its folded position. The boom folds and extends over the cab of the tractor. This is very beneficial for transport and storage of the apparatus and it avoids the need to have the boom extending 20 feet or more rearwardly from the tractor as is the case with previously available apparatus. Preferably, the forward portion of the frame includes an upright support 12B on which the folded boom can rest when it is in its fully retracted position. This is advantageous because it prevents the boom from bouncing during transport, and it also prevents the boom from coming into contact with the cab of the tractor.

Pump system 30 on the side of the fuel tank 14 is effective for moving fuel (e.g., diesel fuel) from the tank through output line 15 along the length of the boom sections to the burner head 18. Line 13 supplies fuel from the tank 14 to fuel pump 31 which is driven by hydraulic pump 33 (through drive coupler 32). This pump arrangement is very advantageous because it is capable of pressurizing the fuel to a very high pressure (e.g. at least about 1,200 psi, and it may be up to about 2,500 psi). This high fuel pressure provides for high burning temperatures and very good fuel efficiency in burning.

Figure 13:
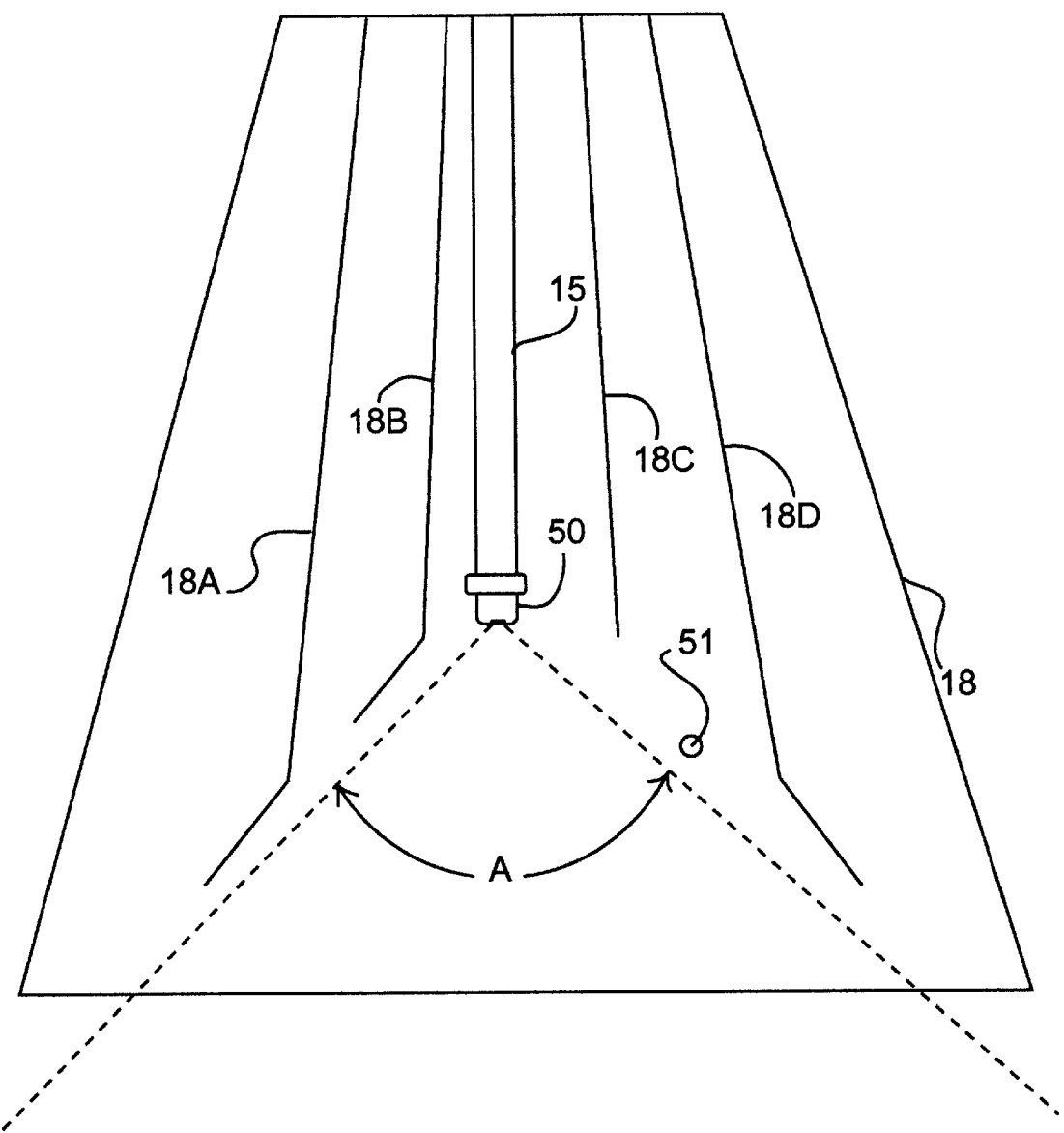
FIG. 13 is a top cut-away view of a preferred burner head used in the invention.
Figure 14:
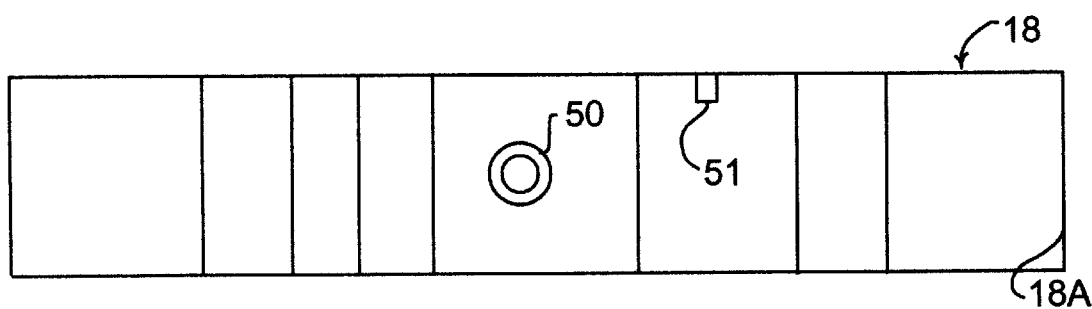
FIG. 14 is an end elevational view of the burner head shown in FIG. 13.

Line 15 extends along the boom 16 to head 18 where it is sprayed out through atomizing nozzle 50. The nozzle is adapted to spray a pattern A of fuel which is about 80 degrees. It is very important for the pattern of sprayed fuel to exit the outer end of the head 18 without contacting the interior of the head. No previously known burner head includes this important feature which eliminates fuel drip and enhances burning efficiency, As shown in FIG. 13, the burner head 18 includes a plurality of guides or vanes 18A, 18B, 18C and 18D which are for the purpose of dividing and distributing the air (which is forced into and through the head by the fan 24) generally uniformly across the area of the open end of the head. This provides for uniform burning of the fuel as it is sprayed out of the head.

In order to ignite the fuel exiting the head 18 there is provided a glow plug 51. The glow plug is controlled from the cab of the tractor (through wire 51A) to thereby enable the operator to ignite the fuel without leaving the cab. When the boom is in the folded (i.e. transport) position, it is preferred to prevent the fuel pump from operating (e.g. by means of a limit switch).

The fuel pump or fuel supply can be turned off by the operator while leaving the fan 24 running in order to cool the head after the flame has been extinguished. This is an another advantage of the apparatus of this invention.

The shape of the head is very important. Preferably the head walls angle outwardly as shown.

The apparatus of this invention may also use propane as a fuel instead of diesel fuel, if that should be desired. No pump is required for this version of the apparatus. Rather, the fuel exits the upper part of a propane tank through a fuel line with a control valve.

Figure 15:
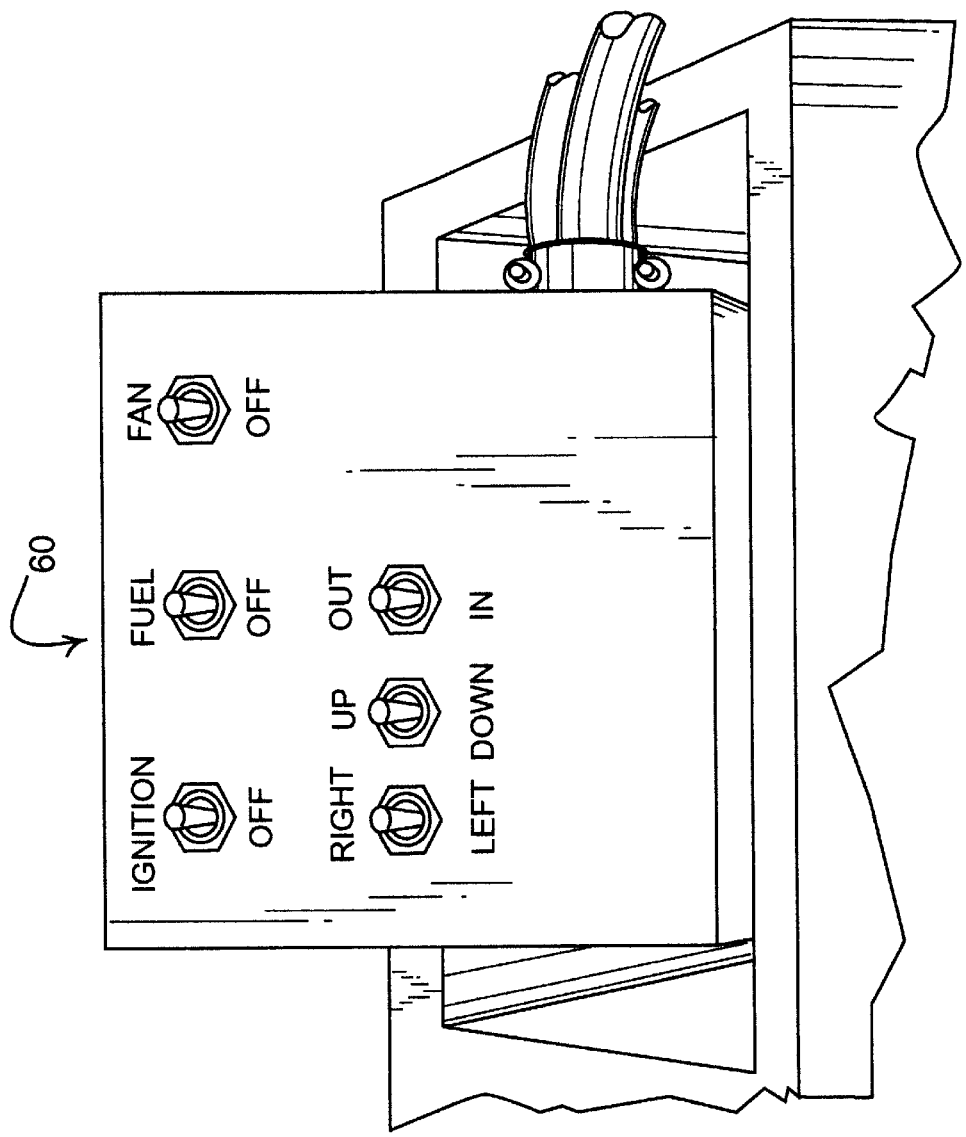
FIG. 15 shows the control panel for the apparatus which is located in the cab of the tractor.

FIG. 15 shows the control panel 60 for controlling the complete operation of the apparatus from the cab of the tractor. Thus, the fuel supply and ignition are easily controlled from the cab as well as control of all boom movements.

Figure 12:
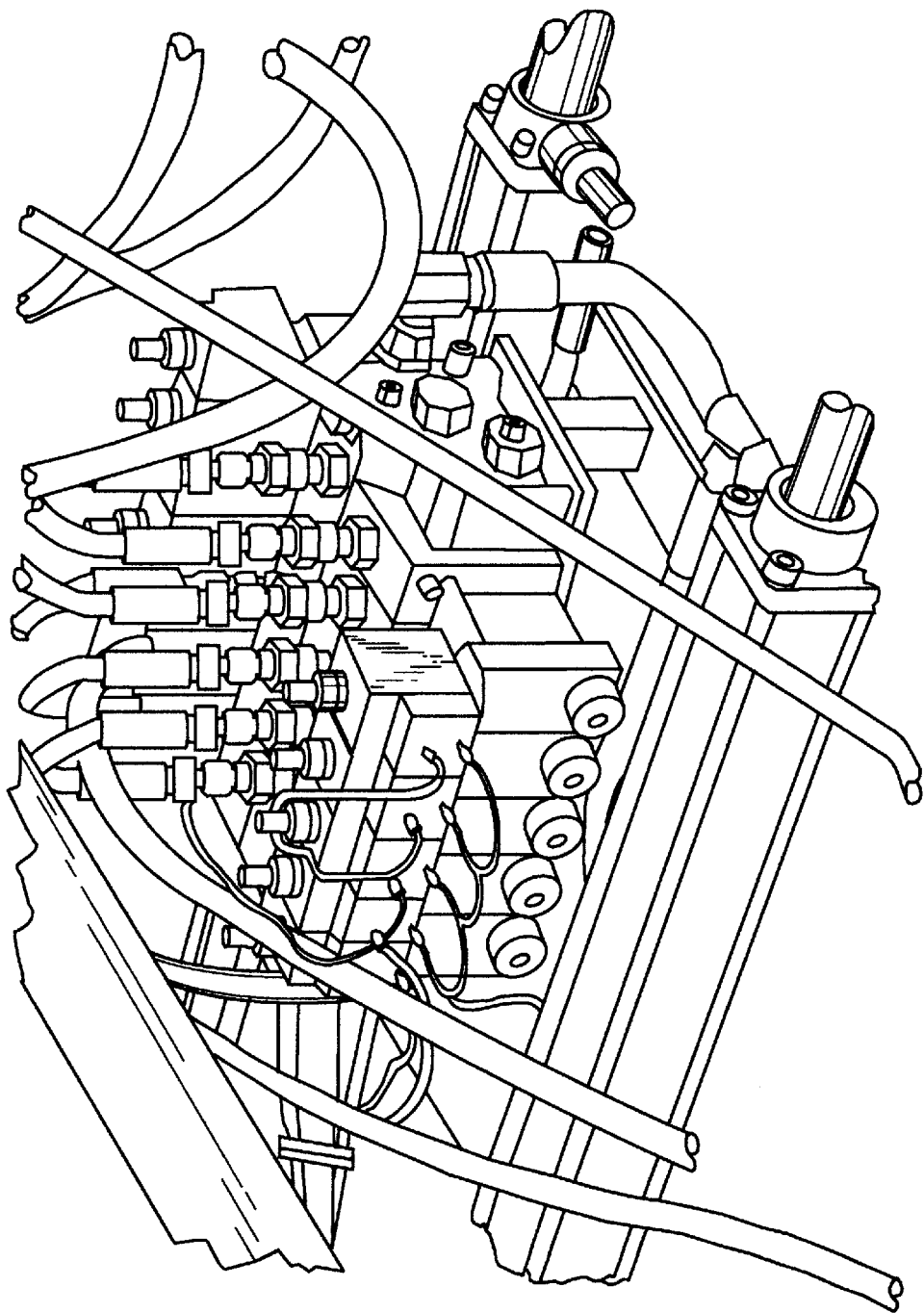
FIG. 12 illustrates a stack valve system useful in the invention.

FIG. 12 shows a hydraulic stack valve system which is preferred for use in the apparatus of this invention. The stack valve is a hydraulic amplifier that makes it possible to power several hydraulic circuits from one main hydraulic source. These are commercially available, for example, from Prince or Waterman. The electric stack valve which controls the functions of the apparatus consists of five valves stacked together with front and rear end plates. The front end plate is where the hydraulic power source from the tractor enters the valve. The first hydraulic valve controls the hydraulic drive motor mounted on the blower fan. The second hydraulic valve controls the hydraulic drive motor which powers the fuel pump motor. The first and second hydraulic valves have open exhaust ports so that the hydraulic motors can turn freely when the valve is shut off to prevent the motors from being damaged. The third valve controls the boom swing from side to side. The fourth valve controls the boom lift up and down and also the boom fold system. The fifth valve controls the pivoting of the outer boom section relative to the inner boom section. The rear end cap on the stack valve returns the exhaust hydraulic fluid back to the tractor.

Other variants are possible without departing from the scope of this invention.

What is claimed is:

1. Apparatus for mounting to a three-point hitch of a tractor; wherein the apparatus comprises:
   (a) frame means including attachment means for detachably mounting said frame means to said hitch;
   (b) fuel source means carried by said frame means;
   (c) an elongated boom member carried by said frame means; wherein said boom member includes first and second ends; wherein said boom member includes first and second boom sections which are pivotably connected together; wherein said first boom section is pivotally connected to the frame means at the boom member first end and said second section is tubular;
   (d) burner means carried by said second boom section; and
   (e) fan means carried by said second boom section for directing air flow through said second boom section and outwardly through said burner means.

2. Apparatus in accordance with claim 1, wherein said fuel source means comprises a tank containing fuel and a pump for conveying fuel from said tank to said burner means at a pressure of at least about 1,200 psi.

3. Apparatus in accordance with claim 1, further comprising first hydraulic means for pivoting said first boom section relative to said frame means.

4. Apparatus in accordance with claim 1, wherein said second boom section includes an inner end and said first boom section includes an outer end which is pivotally connected to said inner end of said second boom section.

5. Apparatus in accordance with claim 1, further comprising second hydraulic means for pivoting said second boom section relative to said outer end of said first boom section.

6. Apparatus in accordance with claim 1, wherein said first boom section is pivotally connected to a vertical shaft carried by said frame means.

7. Apparatus in accordance with claim 2, wherein said burner means further includes a nozzle through which said fuel is sprayed outwardly to exit said burner means.

8. Apparatus in accordance with claim 7, wherein said burner means further comprises glow plug ignition means for igniting fuel in said burner means.

9. Apparatus in accordance with claim 2, wherein said fuel comprises diesel fuel.

10. Apparatus in accordance with claim 1, wherein said fuel comprises propane.

11. Apparatus in accordance with claim 6, further comprising gear means secured to said vertical shaft for selectively rotating said vertical shaft clockwise and counterclockwise.

12. Apparatus in accordance with claim 11, further comprising:

(a) first and second rack means disposed on opposite sides of and being in engagement with said gear means, and (b) first and second ram means operatively connected to said first and second rack means, respectively, and being adapted to move said first and second rack means in opposing directions.

13. Apparatus in accordance with claim 5, wherein said inner end of said second boom section further comprises gear means secured thereto; wherein said outer end of said first boom section further comprises rack means in engagement with said gear means.

14. Apparatus in accordance with claim 13, further comprising a transverse shaft extending through said gear means and through said outer end of said first boom section.

15. Apparatus in accordance with claim 14, wherein said hydraulic means is adapted to move said rack means longitudinally, whereby said gear means is caused to rotate about said transverse shaft.

* * * * *